(12) United States Patent
Basile, II et al.

(10) Patent No.: US 6,213,863 B1
(45) Date of Patent: Apr. 10, 2001

(54) MACHINE AND METHOD FOR AUTOMATIC MUSCLE FAT AND MEMBRANE REMOVAL

(75) Inventors: Vincent L. Basile, II, West Des Moines; Douglas N. McCloskey, Altoona; Stephen H. Cate, Johnston; Donald D. Holms, West Des Moines, all of IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/426,629

(22) Filed: Oct. 26, 1999

(51) Int. Cl.[7] ........................................ A22B 5/16

(52) U.S. Cl. ............................... 452/127; 452/125

(58) Field of Search .................... 452/127, 125

(56) References Cited

U.S. PATENT DOCUMENTS

| | | | | |
|---|---|---|---|---|
| Re. 23,222 | * | 4/1950 | Townsend | 452/127 |
| 2,261,589 | * | 11/1941 | Piper | 452/127 |
| 2,715,427 | * | 8/1955 | Townsend | 452/127 |
| 5,236,323 | | 8/1993 | Long et al. . | |
| 5,350,334 | | 9/1994 | Holms . | |
| 5,399,118 | * | 3/1995 | Long et al. | 452/127 |
| 5,503,593 | * | 4/1996 | Schill | 452/127 |
| 5,609,519 | | 3/1997 | Townsend . | |

FOREIGN PATENT DOCUMENTS 0 583 593 A1    6/1993   (EP) ........................... A22C/17/12

* cited by examiner

Primary Examiner—Willis Little
(74) Attorney, Agent, or Firm—Zarley, McKee, Thomte, Voorhees & Sease

(57) ABSTRACT

A conventional meat skinning machine has a frame, a horizontal auger on the frame having a forward end, a tooth gripping roll rearwardly mounted on the frame and extending across the forward end of the conveyor, and an elongated cutting blade mounted on the frame adjacent the gripping roll to remove material from the outer surface of a meat product coming in contact therewith. An elongated flipper plate is mounted on the frame adjacent the cutting edge of the cutting blade. A pair of parallel arms are pivotally secured to the frame adjacent the sides of the conveyor and extend upwardly and forwardly from their pivotal connections. A resilient hold down roll is rotatably mounted between the forward ends of the arms. A lifting mechanism is provided on the frame and connected to the arms for raising and lowering the arms at selected intervals. A link extends from at least one of the arms and is connected to the flipper plate so that when the arms are raised, the flipper plate is partially erect so as to block the movement of a meat product moving forwardly over the plate and to allow the meat product to be rotated by the gripper roll and the conveyor across the cutting edge of the blade. A method is provided for automatically removing material from the outer surface of a meat product, as described above, including the further steps of simultaneously lowering the hold down roll and the flipper plate so that the hold down roll contacts the meat product.

8 Claims, 7 Drawing Sheets

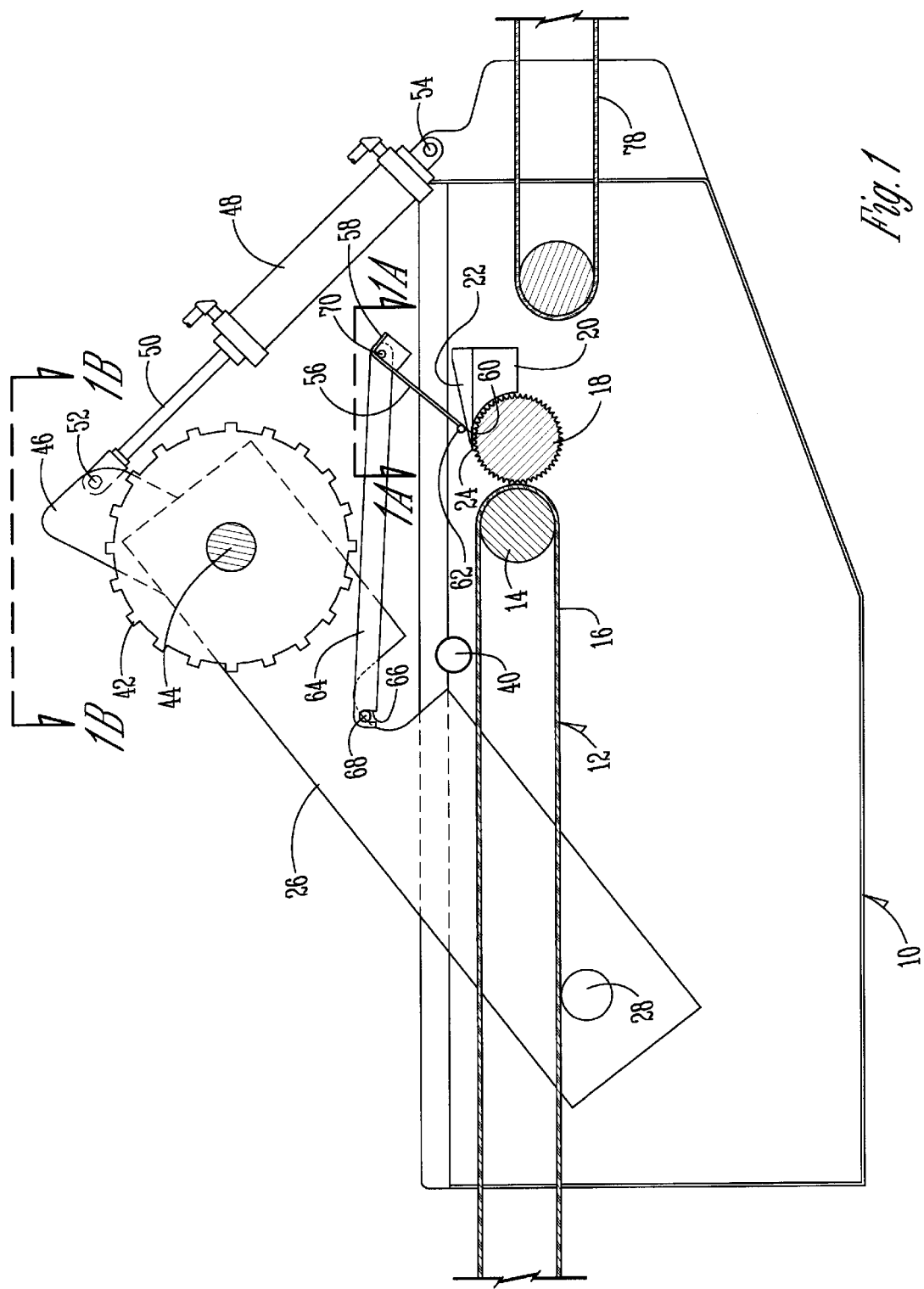

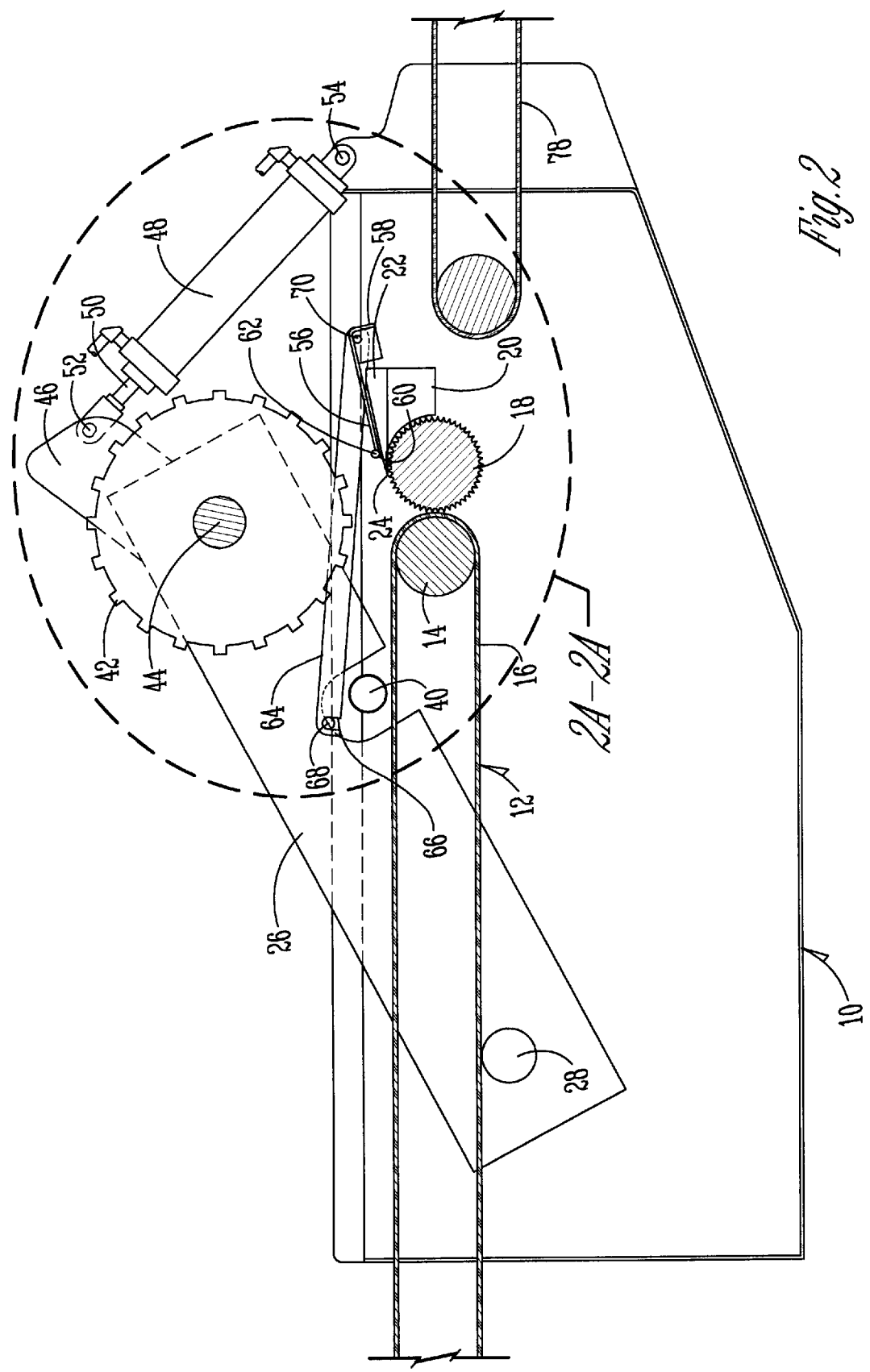

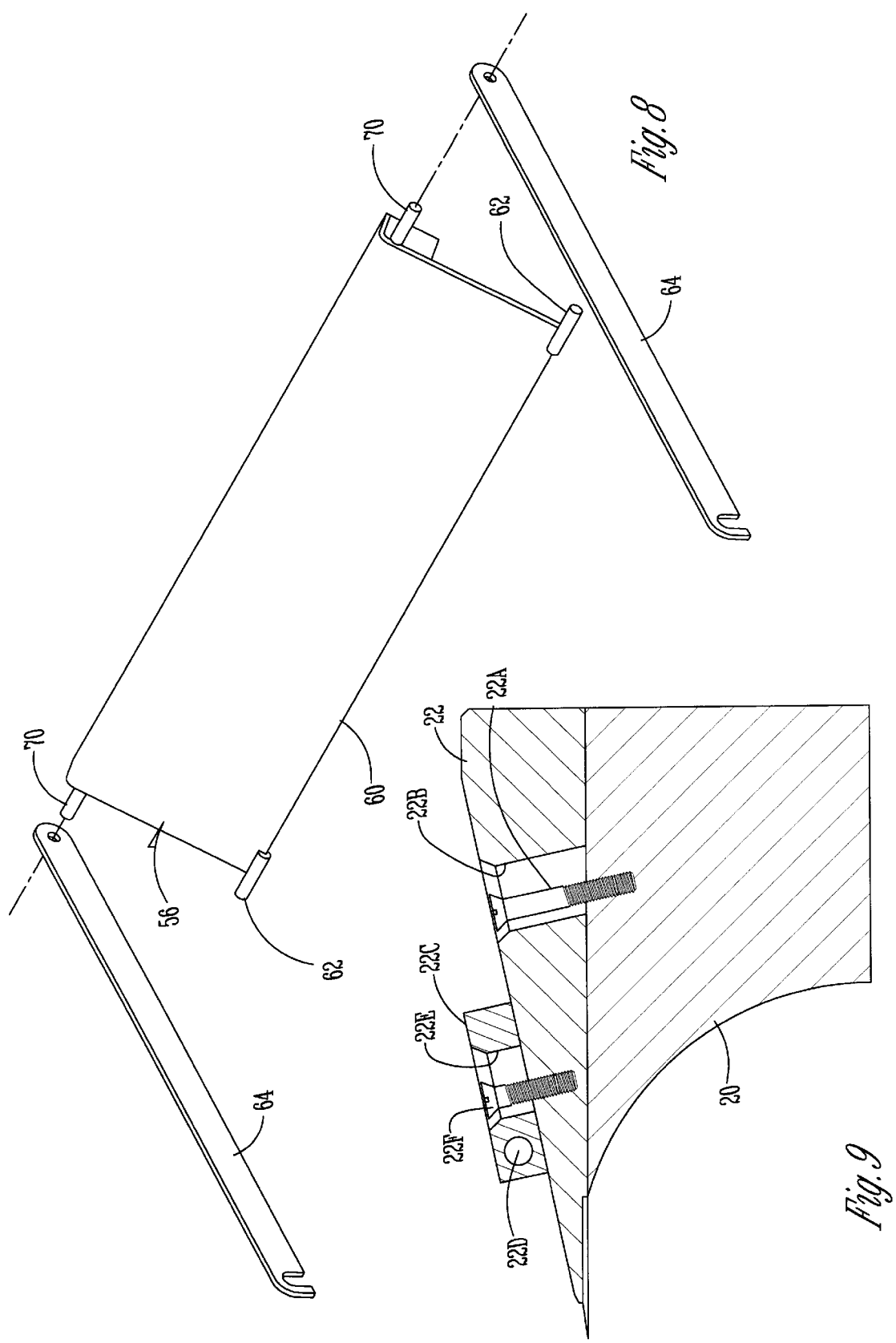

MACHINE AND METHOD FOR AUTOMATIC MUSCLE FAT AND MEMBRANE REMOVAL

BACKGROUND OF THE INVENTION

In the meat processing industry, it is necessary to remove a certain amount of fat and membrane from animal muscles. This is conventionally accomplished by the use of open top skinning machines wherein the muscles are manipulated by hand to expose various surfaces of the muscle or meat product to the cutting blade and gripping roll of the skinning machine. This system is tedious, and can cause repetitive motion injuries. It is also relatively slow, and there is a high variation in the amount of material removed due to the differences in skinning machine operators.

It is therefore a principal object of this invention to provide a meat product skinning machine which will automate the fat and membrane removing process so that the operator needs only to place the meat product on the intake conveyor on the machine, and which will substantially increase the output of the machine.

A further object of this invention is to provide a meat product skinning machine that will be safer to operate; which will eliminate repetitive motion injuries, and which will eliminate operator-induced variations in the final "skinned" products.

These and other objects will be apparent to those skilled in the art.

SUMMARY OF THE INVENTION

A conventional meat skinning machine has a frame, a horizontal conveyor on the frame having a forward end, a tooth gripping roll rearwardly mounted on the frame and extending across the forward end of the conveyor, and an elongated cutting blade mounted on the outer surface of a meat product coming in contact therewith. An elongated flipper plate is mounted on the frame adjacent the cutting edge of the cutting blade. A pair of parallel arms are pivotally secured to the frame adjacent the sides of the conveyor and extend upwardly and forwardly from their pivotal connections. A resilient hold down roll is rotatably mounted between the forward ends of the arms. A lifting mechanism is provided on the frame and connected to the arms for raising and lowering the arms at selected intervals. A link extends from at least one of the arms and is connected to the flipper plate so that when the arms are raised, the flipper plate is partially erect so as to block the movement of a meat product moving forwardly over the plate and to allow the meat product to be rotated by the gripper roll and the conveyor across the cutting edge of the blade so that the blade can remove surface material on a plurality of exterior surfaces of the meat product.

A method is provided for automatically removing material from the outer surface of a meat product, as described above, including the further steps of simultaneously lowering the hold down roll and the flipper plate so that the hold down roll contacts the meat product which is released from the location of the cutting blade over the then substantially horizontal flipper plate.

BRIEF DESCRIPTION OF THE DRAWINGS

FIG. 1 is a vertical sectional view of the machine of this invention take with the hold down roll and the flipper plate in a raised condition to allow a meat product to be rotated against the flipper plate by the gripper roll;

FIG. 2 is a view similar to that of FIG. 1 but with the hold down roll and flipper plate in a lowered condition to allow the meat product to be released and to move forwardly over the flipper plate;

FIG. 8 is an enlarged scale exploded perspective view of the flipper plate and linkage arms; and FIG. 9 is an enlarged scale sectional view of an alternate mounting assembly for the flipper plate.

DESCRIPTION OF THE PREFERRED EMBODIMENT

Figure 1A:
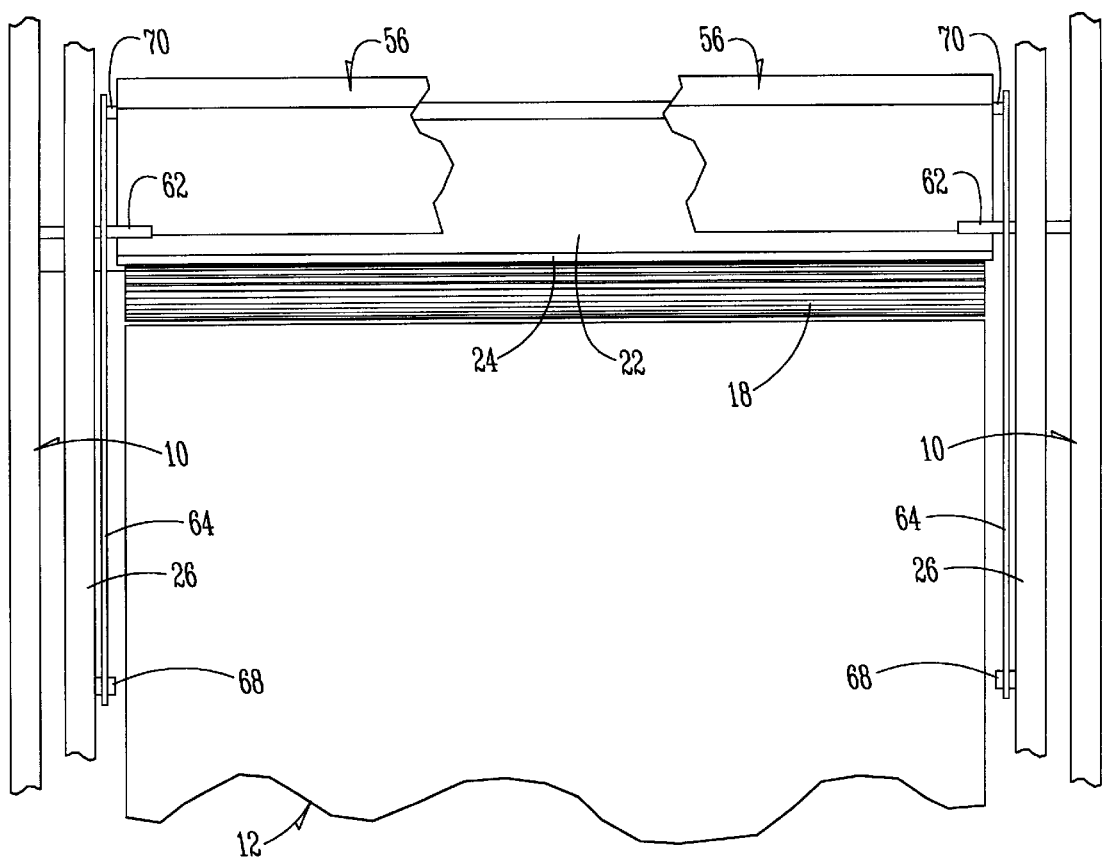
FIG. 1A is an enlarged scale plan view taken on line 1A—1A of FIG. 1.
Figure 1B:
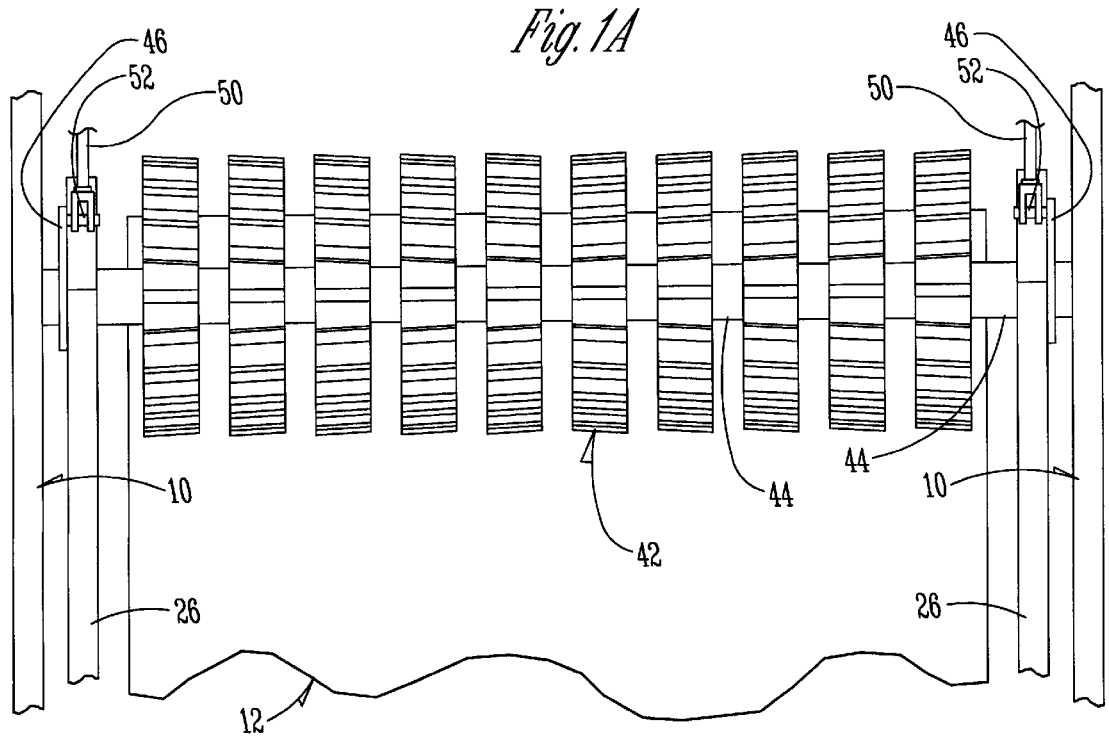
FIG. 1B is an enlarged scale plan view taken on line 1B—1B of FIG. 1.
Figure 2A:
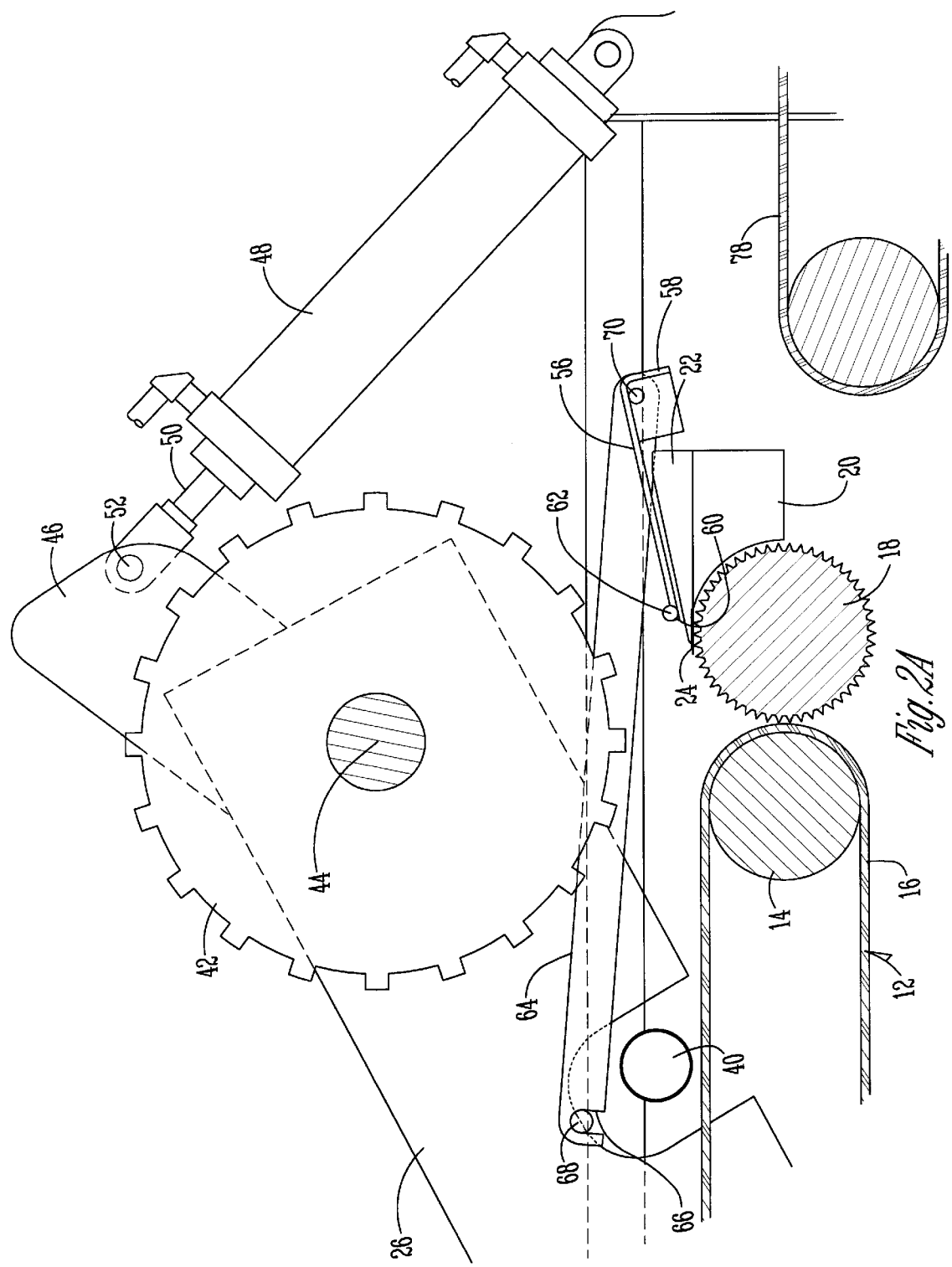
FIG. 2A is an enlarged scale portion of FIG. 2 taken on line 2A—2A of FIG. 2.

With reference to FIGS. 1, 2 and 2A, a frame 10 supports a conveyor belt 12 having a roll 14 at the forward end 16 of the conveyor. A conventional tooth gripper roll 18 is mounted on the frame and is powered by any conventional means (not shown). A conventional shoe 20 is mounted on the frame forwardly of the gripper roll and has a concave surface to accommodate the curved surface of the gripper roll with which it is closely spaced. A conventional blade holder 22 is mounted on the frame and holds blade 24 tightly against the shoe 20.

The foregoing structure is essentially conventional in existing meat product skinning machines.

A pair of arms 26 are pivotally secured to frame 10 by shafts 28. An inverted U-shaped notch 30 is cut in each of the arms 26 at their lower mid portions to permit a light sensor 40 to project a beam across the top of conveyor 12 to signal the arrival of a meat product on the conveyor. A conventional hold down roll 42 of resilient material is rotatably mounted on the upper ends of arms 26 by shaft 44. A protruding ear 46 is secured to the forward ends of each of the arms 26. A pair of air cylinders 48 are mounted on the frame 10 and include a piston rod 50 which extends movably in a direction towards ears 46 to which the ends of the piston are pivotally secured by pin and device assembly 52. The lower ends of the air cylinders 48 are pivotally secured to the frame 10 by pivot pins 54.

A flipper plate 56 (as best shown in FIGS. 2A and 8), has a top edge 58 and a bottom edge 60. Flipper plate 56 has a length substantially equal to that of the gripper roll 18 and the cutting blade 24. The flipper plate 56 is pivotally secured to the frame along its lower edge by pivot pin 62.

Elongated links 64 (FIG. 2A) have an inverted notch 66 at their lower rearward ends which dwell on laterally extending pins 68 which are secured to the frame 10. The forward ends of the links 64 are secured to the gripper plate 56 by pins 70.

A conventional piece of meat product to be processed by the machine and method of this invention is designated by the numeral 72.

Figure 3:
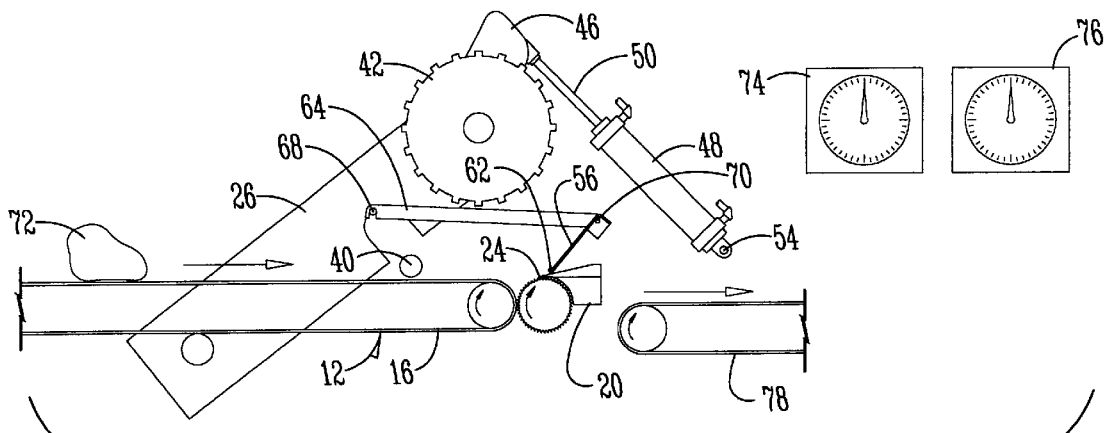
FIGS. 3–7 are reduced scale schematic views similar to those of FIGS. 1 and 2 showing the steps and component positions as a meat product is subjected to treatment.
Figure 4:
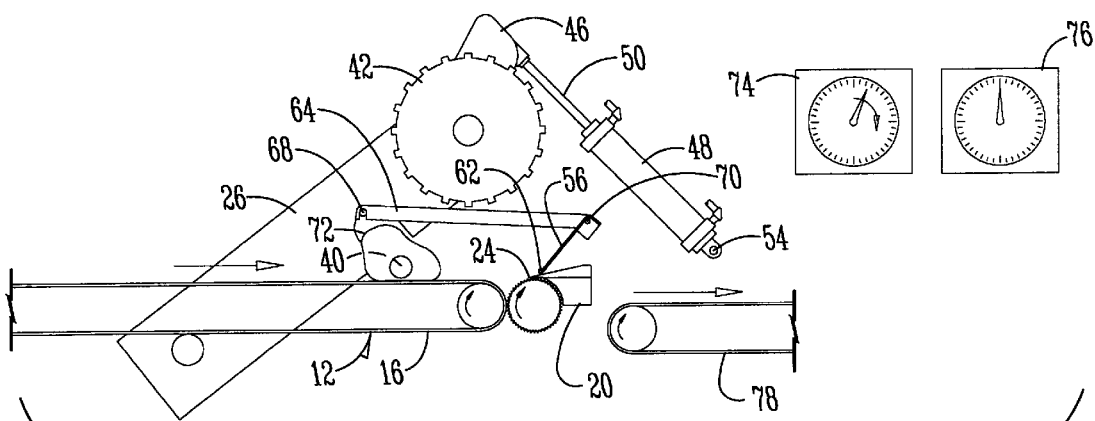

With reference to FIGS. 3–7, a pair of timer clocks 74 and 76 are mounted on the frame 10 and are operatively connected to the air cylinders 48 to control the compressed air supply to the cylinders to in turn control the operational sequence of the cylinders and the components directly or indirectly attached thereto. With reference to FIG. 3, at time "zero", the cylinders are in their normal extended position with piston rods 50 elevating the arms 26. This causes the links 64 which are connected to the arms 26 to raise the gripper plate 56 to the elevated position shown in FIG. 3. It should also be noted in FIG. 3 that the meat product 72 is moving in a forwardly direction on the conveyor belt 12 towards the cutting blade 24.

Figure 5:
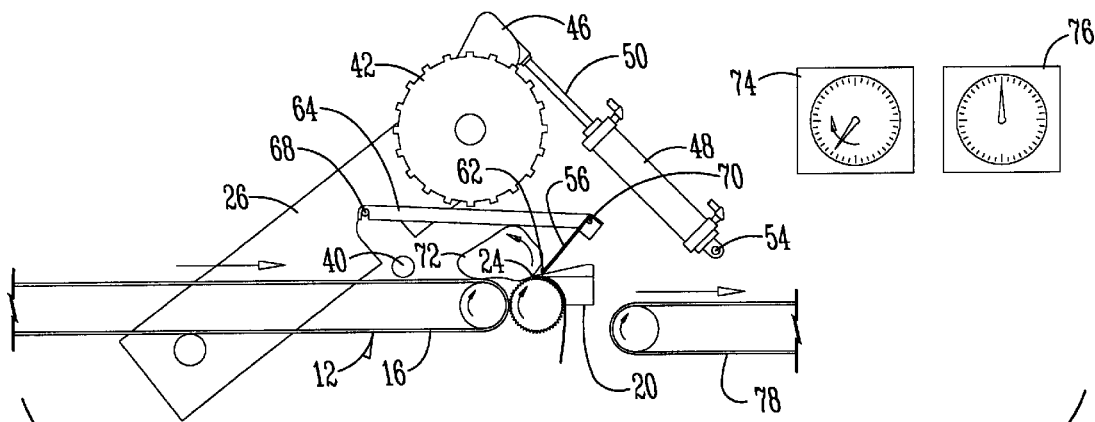
Figure 6:
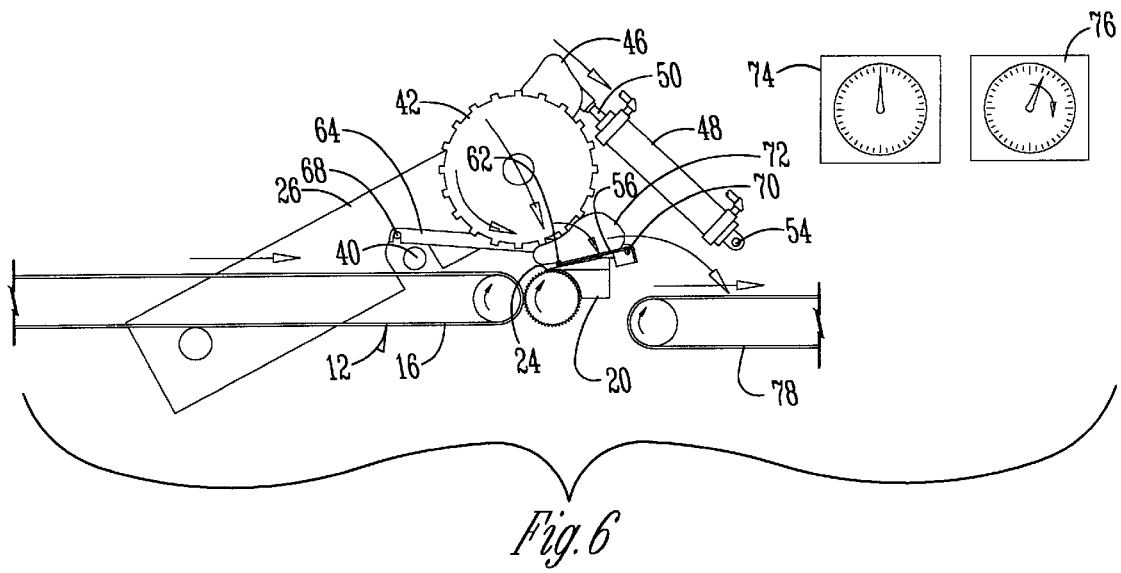
Figure 7:
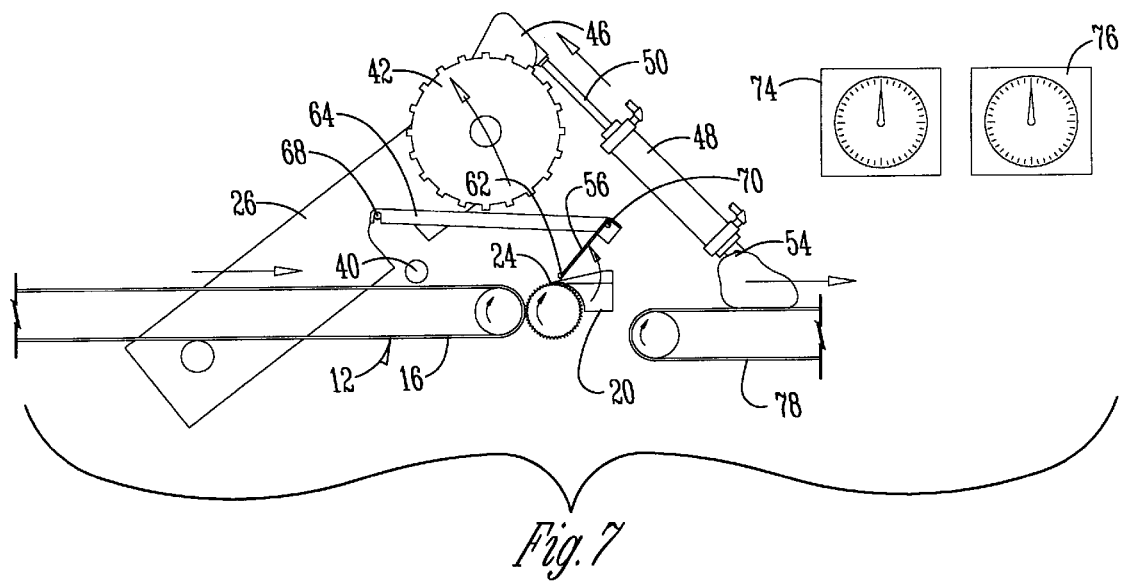

As soon as the meat product 72 intersects the light projection of sensor 40, the clock 74 begins to turn the first sequence of the process. This first phase of the process commences as shown in FIG. 5 when the meat product 72 engages the gripper plate 56 which blocks the further longitudinal movement of the meat product because of the substantially vertical but yet slightly inclined position of the flipper plate. The conveyor belt 12 and the gripper roll 18 continue to exert forward pressure on the meat product during this phase, but as shown in FIG. 5, the meat product will rotate against the flipper plate 56 since it cannot go forward by reason of the angular disposition of the flipper plate. This permits a number of exterior surface areas on the meat product to be exposed to the conventional "skinning" or "trimming" function of the blade 24. After the passage of a few seconds as measured by clock 24, and as best shown in FIG. 6, clock 74 reaches its "zero" initial position and clock 76 begins to time the next phase of the process. Clock 76 sends a signal to the air control valve (not shown) for cylinders 48 which causes the piston 50 to retract into the cylinder and pull the arms 26 downwardly. This causes the hold down roll 42 to exert downward pressure on the meat product 72. As the arms 26 are pivoted downwardly, the links 64 pivot the flipper plate 56 to a substantially horizontal position as shown in FIG. 6, whereupon the meat product 72 is moved forwardly and downwardly for deposit on discharge conveyor 78. Immediately following the activity shown in FIG. 6, the clock 76 has returned to its "zero" position, whereupon the air supply valve to the cylinders 48 cause piston rod 50 to extend, as shown in FIG. 7, whereupon the apparatus returns to its original position of FIG. 3 awaiting the arrival of another meat product to be sensed by the sensor 40.

With reference to FIG. 9, the blade clamp or holder 22 can be conventionally adjustably secured to shoe 20 by screws 22A which extend through slots 22B in blade clamp 22 for threadable connection to shoe 20. Similarly, the pivotal position of the flipper plate 56 can be adjustably secured to blade clamp 22 by means of mounting blocks 22C which have horizontal apertures 22D and elongated slots 22E. Screws 22F extend through slot 22E. Screws 22F extend through slot 22E. Screws 22F extend through slot 22E to adjustably secure mounting blocks 22C to the blade clamp 22. Pivot rods 62 are pivotally mounted in apertures 22D in blocks 22C.

It can be seen from the foregoing that the operator can merely place the meat products on the conveyor belt 12, whereupon the meat products will be automatically processed for the removal of layers of fat or membranes. This will double or triple the capacity of the machine as compared to conventional procedures. The process is very safe since the hands of the operator never have to be close to the cutting blade 24. The meat products will be uniformly cut as distinguished by the variations normally caused through different techniques of individual machine operators. Repetitive motion injuries of the operators will no longer take place. It is thus seen that this invention will achieve at least all of its stated objectives.

What is claimed is:

1. A device of the class described, comprising, a frame, a horizontal conveyor on the frame having a forward end, a toothed gripping roll rotatably mounted on the frame and extending across the forward end of the conveyor and being at a level to grip meat products being conveyed on the conveyor towards the forward end of the conveyor, an elongated cutting blade mounted on the frame adjacent a meat product gripping surface of the gripping roll to remove fat or membrane from a meat product gripped by the gripping roll, an elongated flipper plate having top and bottom horizontal edges pivotally mounted along the bottom edge at a location adjacent to and forwardly of a cutting edge of the cutting blade, a pair of parallel arms pivotally secured to the frame adjacent sides of the conveyor and extending forwardly from their pivotal connections to the frame, a hold down roll rotatably mounted between forward ends of the arms, lifting means of the frame connected to the arms for raising and lowering the arms, link means connecting at least one of the arms and the flipper plate so that when arms are raised, the flipper plate is partially erect so as to block the movement of a meat product forwardly over the plate and to allow the meat product to be rotated by the gripper roll and the conveyor on the plate and in contact with the cutting blade so that the cutting blade can remove surface material from a plurality of exterior surfaces on the meat product, and so that the flipper plate will move to a less inclined position when the arms are lowered to permit the meat product to move forwardly over the flipper plate.

2. The device of claim 1 wherein a sensor is mounted on the frame at a position rearwardly of the cutting blade to detect the presence of meat product moving forwardly towards the cutting blade, a controller connecting the sensor and the lifting means to raise and then lower the parallel arms to control the orientation of the flipper plate and to permit the hold down roll to engage the meat product when arms are in a lowered position.

3. The device of claim 2 wherein the controller raises and lowers the parallel arms in accordance with a predetermined timing schedule.

4. A method of removing surface material from a meat product on a machine having a conveyor, a cutting blade at an end of conveyor, comprising, completely rotating a meat product over the cutting blade for a first period of time, placing an inclined plate adjacent the cutting blade to block the longitudinal movement of the rotating meat product, and then releasing the meat product for continued longitudinal movement away from the cutting blade.

5. The method of claim 4 wherein a pivotal plate is used to facilitate the rotation of the meat product by blocking the forward longitudinal movement of the meat product over the cutting blade.

6. The method of claim 4 wherein a hold down roller engages the meat product, and the plate is moved to a non-blocking position, to move the meat product away from the cutting blade.

7. The method of claim 6 wherein a controller controls a time sequence between rotating the meat product and thence moving the plate to the non-blocking position to release the same for movement away from the cutting blade.

8. The device of claim 1 wherein the cutting blade is mounted in a blade clamp, and the flipper plate is adjustably pivotally mounted to the blade clamp to selectively vary its position with respect to the cutting blade.

* * * * *